Jan. 28, 1947. C. G. WIATT 2,414,912
EMERGENCY IGNITION CIRCUIT BREAKER
Filed Dec. 19, 1944
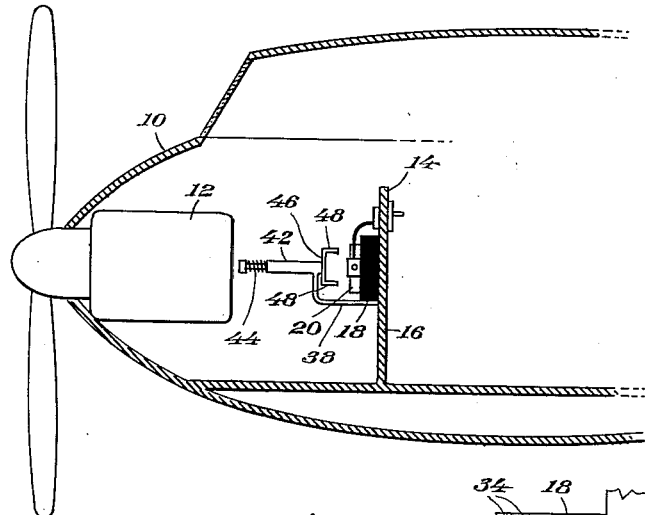
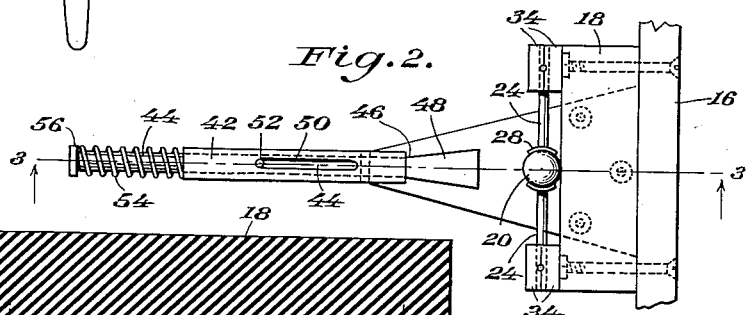
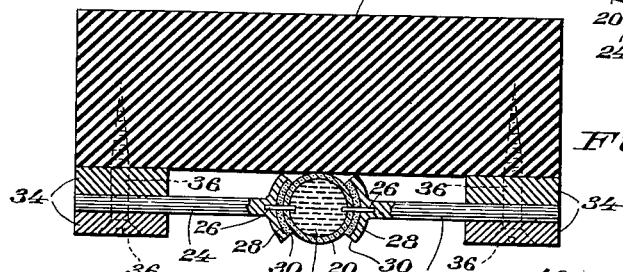
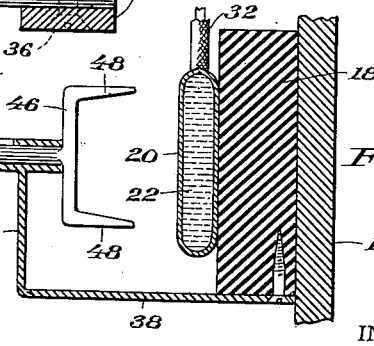
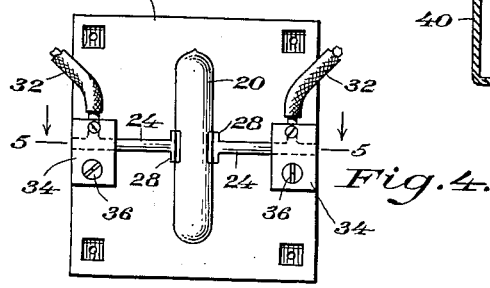
INVENTOR.
Charles G. Wiatt
BY Victor J. Evans & Co.
ATTORNEYS Patented Jan. 28, 1947

2,414,912

UNITED STATES PATENT OFFICE 2,414,912

EMERGENCY IGNITION CIRCUIT BREAKER

Charles G. Wiatt, Gloucester, Va.

Application December 19, 1944, Serial No. 568,845

3 Claims. (Cl. 200—52)

My invention relates to ignition systems of aircraft, automotive vehicles and the like, and has among its objects and advantages the provision of an improved emergency circuit breaker.

In the accompanying drawing:

Figure 1 is a diagrammatic outline of a portion of an aircraft and its engine illustrating my invention applied thereto;

Figure 2 is a top plan view of the circuit breaker;

Figure 3 is a sectional view taken along the line 3—3 of Figure 2;

Figure 4 is a face view; and

Figure 5 is an enlarged sectional view taken along the line 5—5 of Figure 4.

In the embodiment selected for illustration, Figure 1 illustrates a portion of an airplane fuselage 10 having an engine 12 mounted therein. The circuit breaker is illustrated at 14 and is mounted rearwardly of the engine 12 in close proximity thereto.

The circuit breaker 14 comprises a support 16 having a body or mount 18 secured thereto. Upon the mount 18 is supported a glass tube 20 filled with mercury 22. Copper circuit rods are electrically connected with the mercury 22 by reason of copper pins 26 extending through openings in the glass tube 20 for electrical connection with the mercury 22. Each rod 24 includes a curved flange 28 between which and the glass tube 20 is positioned a sealing and cushioning member 30.

The rods 24 are respectively electrically connected with wires 32 of the ignition circuit and the rods are fixedly clamped between blocks 34 connected into a unitary structure with the mount 18 by means of screws 36. A bracket 38 is secured to the mount 18 and is provided with a right angular arm 40 fixedly connected with a sleeve 42 in which is slidably mounted a rod 44 having one end spaced slightly from the engine 12. One end of the rod 44 is provided with a tube breaking head 46 having fingers 48 arranged to engage the tube 20 near its ends to rupture the tube when the engine 12 is driven rearwardly, as in the case of a nose dive into the ground. Rupturing of the tube 20 spills the mercury 22 so as to break the ignition circuit.

The tube 42 is provided with a slot 50 for slidably receiving a pin 52 fixedly secured to the tube 44. Thus the pin 52 permits axial movement of the rod 44 relatively to the tube 42 but restrains the tube from relative rotation so as to hold the fingers 48 in proper alignment with the tube 20. Normally the head 46 is positioned in the manner of Figure 3 by reason of a compression spring 54 having one end lying in engagement with the tube 42 and its other end abutting a nut 56 threaded onto the end of the rod 44.

The tube 20, when engaged by the fingers 48, is broken at both ends so as to insure proper spilling of the mercury regardless of the position of the aircraft or other vehicle in an emergency impact. In other words, both ends are broken so that proper spillage is attained notwithstanding the fact that the aircraft or the vehicle might land in an upside down position. The same is true when the impact occurs with the vehicle or aircraft landing on its side.

Without further elaboration, the foregoing will so fully illustrate my invention, that others may, by applying current knowledge, readily adapt the same for use under various conditions of service.

I claim:

1. A circuit breaker for an electrical circuit comprising a frangible receptacle containing a fluid conductor electrically connected with an electrical circuit, and a receptacle breaker normally spaced from the receptacle and shiftable with relation to the receptacle whereby a blow will drive the breaker into the receptacle and break the latter to spill said fluid conductor and open the circuit, said receptacle comprises a glass tube closed at its ends and in which said fluid conductor comprises mercury, conductor shafts provided with pins extending through openings in the receptacle, flanges on said shafts, sealing means between said flanges and the tube and about the exterior portions of said pins, means for fixedly securing said shafts to support said receptacle, said breaker comprising a head having two fingers respectively engageable with the end margins of the receptacle, a stem on said head, a tube slidably guiding said stem and having a slot, a pin on said stem extending through said slot to restrain the stem and the head rotation relatively to the tube, a spring acting on said stem and said tube to hold said fingers in spaced relationship with said receptacle.

2. In a vehicle having an engine for driving the same and an ignition circuit for said engine; an automatic safety device interposed in said ignition circuit for interrupting the same upon crash or shock impact of the vehicle, said automatic safety device including a glass tubular container having sealed ends, mercury in said glass container filling the same, a pair of axially aligned spaced rod members secured to the vehicle perpendicular to and on opposite sides of said tubular glass container, arcuate members secured to adjacent ends of said rod members, cushioning members on said arcuate members engaging said glass container at diametrically opposite portions thereof to support the same, axial pins attached to said rod members, said pins extending towards each other through the glass container into the interior thereof and embedded in a spaced relationship relative to each other within said mercury, means for connecting the rods into the ignition circuit, a sleeve having a longitudinal slot and secured to the vehicle, a breaker rod slidable mounted in said sleeve, a pair of spaced axial fingers on one end of said breaker rod spaced from but adapted to strike the ends of said glass container to break the same, a guide pin secured to said breaker rod and slidable in said sleeve slot for guiding said breaker fingers for movement in a plane substantially containing the longitudinal axis of said glass container, spring means encircling said breaker rod and abutting said sleeve and the other end of said breaker rod for maintaining said fingers thereof spaced from said glass container, whereby upon a crash or shock impact of said vehicle, a part of the same will force said breaker rod against the action of said spring means toward the glass container causing said breaker fingers to break said glass tubular container spilling the mercury and thereby breaking the electrical circuit at said pins to interrupt the ignition circuit to stop the engine.

3. In a vehicle having an engine for driving the same and an ignition circuit for said engine; an automatic safety device interposed in said ignition circuit for interrupting the same upon crash or shock impact of the vehicle, said automatic safety device including a frangible container, an electrically-conductive fluid means therein, means securing said frangible container to the vehicle and electrically interposed in the ignition circuit, contact pins attached to said means and projected through the walls of said frangible container and embedded in spaced relationship to each other in said fluid means, a breaker rod having a projection thereon spaced from, but adapted to strike, the frangible container to break the same, support means secured to the vehicle and slidably receiving said breaker rod for guiding the projection thereof in a plane substantially containing said glass container, a spring device cooperating with said support means and said breaker rod to yieldably maintain the projection thereof at a predetermined distance from said frangible container, whereby upon a crash or shock impact of said vehicle, a part of the same will force said breaker rod projection against said frangible container to break the same and thereby interrupting the ignition circuit to stop the engine.

CHARLES G. WIATT.